United States Patent
Gohil

(10) Patent No.: US 10,686,717 B1
(45) Date of Patent: Jun. 16, 2020

(54) DYNAMIC ALLOCATION OF CONTENT REQUESTS TO CONTENT PROVIDERS

(71) Applicant: Sprint Communications Company L. P., Overland Park, KS (US)

(72) Inventor: Jaideepsinh Gohil, Kansas City, KS (US)

(73) Assignee: Sprint Communications Company, L.P., Overland Park, KS (US)

( * ) Notice: Subject to any disclaimer, the term of this patent is extended or adjusted under 35 U.S.C. 154(b) by 199 days.

(21) Appl. No.: 15/937,768

(22) Filed: Mar. 27, 2018

(51) Int. Cl.
*H04L 29/08* (2006.01)
*H04L 12/911* (2013.01)

(52) U.S. Cl.
CPC .......... *H04L 47/70* (2013.01); *H04L 67/1002* (2013.01); *H04L 67/32* (2013.01)

(58) Field of Classification Search
CPC ...... H04L 47/70; H04L 67/1002; H04L 67/32
USPC .......................................................... 709/226
See application file for complete search history.

(56) References Cited

U.S. PATENT DOCUMENTS

| | | | | |
|---|---|---|---|---|
| 4,179,074 A | * | 12/1979 | Flavel | B02C 25/00 241/24.1 |
| 2010/0306344 A1 | * | 12/2010 | Athas | G06F 16/957 709/219 |
| 2011/0066488 A1 | * | 3/2011 | Ludewig | G06Q 30/00 705/14.43 |
| 2011/0078283 A1 | * | 3/2011 | Gokurakuji | G06Q 10/06 709/219 |
| 2015/0046591 A1 | * | 2/2015 | Zhu | H04L 47/70 709/226 |
| 2015/0118991 A1 | * | 4/2015 | Chung | G06Q 20/14 455/406 |
| 2017/0046254 A1 | * | 2/2017 | Buege | G06F 11/0709 |
| 2017/0078328 A1 | * | 3/2017 | McGinnity | H04L 9/3263 |

* cited by examiner

*Primary Examiner* — Sm A Rahman
*Assistant Examiner* — Chen-Liang Huang

(57) ABSTRACT

A method of allocating content requests to content sources. The method comprises accessing records by an application executing on a computer system from a data store, analyzing the records with reference to time-outs of content requests, content responses with error code, content responses that failed to satisfy content screening criteria, with reference to day of the week, time of day, and processing loads on content sources, based on the analysis of the records adapting a model of content request distribution by the application, where the model defines a plurality of different content request allocation sequences where each content request allocation sequence is associated with a criteria for applying that sequence based on current conditions, selecting a sequence by the application based on comparing current conditions to the criteria and writing the selected content request allocation sequence by the application into a configuration of the content request allocation system.

20 Claims, 7 Drawing Sheets

DYNAMIC ALLOCATION OF CONTENT REQUESTS TO CONTENT PROVIDERS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices are very widely used in the United States. These mobile communication applications provide voice communication and data communication services. Many mobile communication devices support downloading and installing mobile applications, such as gaming applications, special interest applications, streaming media applications, and other applications.

SUMMARY

In an embodiment, a content request allocation adaptation system is disclosed. The system comprises a processor, a non-transitory memory, and an application stored in the non-transitory memory. When executed by a processor, the method accesses records of content request transactions from a data store and analyzes the records of content request transactions with reference to time-outs of content requests, content responses with error code, content responses that failed to satisfy content screening criteria, with reference to day of the week, time of day, and processing loads on content sources at the time of the content request transaction. The application further, based on the analysis of the records of content request transactions, adapts a model of content request distribution. The model defines a plurality of different content request allocation sequences where each content request allocation sequence is associated with a criteria for applying that content request allocation sequence based on current conditions in a content request allocation system. The application further monitors current conditions in a content request allocation system, where the content request allocation system is separate from the content request allocation adaptation system. The application further selects a content request allocation sequence based on comparing current conditions to the criteria for applying content request allocation sequences of the adapted model and writes the selected content request allocation sequence into a configuration of the content request allocation system. Through the processing of the application, the content request allocation system is dynamically adapted to current conditions of the content request allocation system.

In another embodiment, a method of dynamically allocating content requests to content sources is disclosed. The method comprises accessing records of content request transactions by an application executing on a computer system from a data store. The method further comprises analyzing the records of content request transactions by the application with reference to time-outs of content requests, content responses with error code, content responses that failed to satisfy content screening criteria, with reference to day of the week, time of day, and processing loads on content sources at the time of the content request transaction. The method further comprises, based on the analysis of the records of content request transactions, adapting a model of content request distribution by the application. The model defines a plurality of different content request allocation sequences where each content request allocation sequence is associated with a criteria for applying that content request allocation sequence based on current conditions in a content request allocation system. The method further comprises monitoring current conditions in a content request allocation system by the application and selecting a content request allocation sequence by the application based on comparing current conditions to the criteria for applying content request allocation sequences of the adapted model. The method further comprises writing the selected content request allocation sequence by the application into a configuration of the content request allocation system. Through the processing of the method, the content request allocation system is dynamically adapted to current conditions of the content request allocation system.

In yet another embodiment, a method of dynamically allocating content requests to content sources is disclosed. The method comprises accessing records of content request transactions by an application executing on a computer system from a data store. The method further comprises analyzing the records of content request transactions by the application with reference to time-outs of content requests, content responses with error code, content responses that failed to satisfy content screening criteria, with reference to day of the week, time of day, and processing loads on content sources at the time of the content request transaction. The method further comprises, based on the analysis of the records of content request transactions, adapting a model of content request distribution by the application. The model defines a plurality of different content request allocation sequences where each content request allocation sequence is associated with a criteria for applying that content request allocation sequence based on current conditions in a content request allocation system. The method further comprises monitoring current conditions in a content request allocation system by the application and selecting a content request allocation sequence by the application based on comparing current conditions to the criteria for applying content request allocation sequences of the adapted model and based on comparing a count of content transactions completed by a content source to a daily quota of content transactions of the content source. The method further comprises writing the selected content request allocation sequence by the application into a configuration of the content request allocation system. Through the processing of the method, the content request allocation system is dynamically adapted to current conditions of the content request allocation system.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
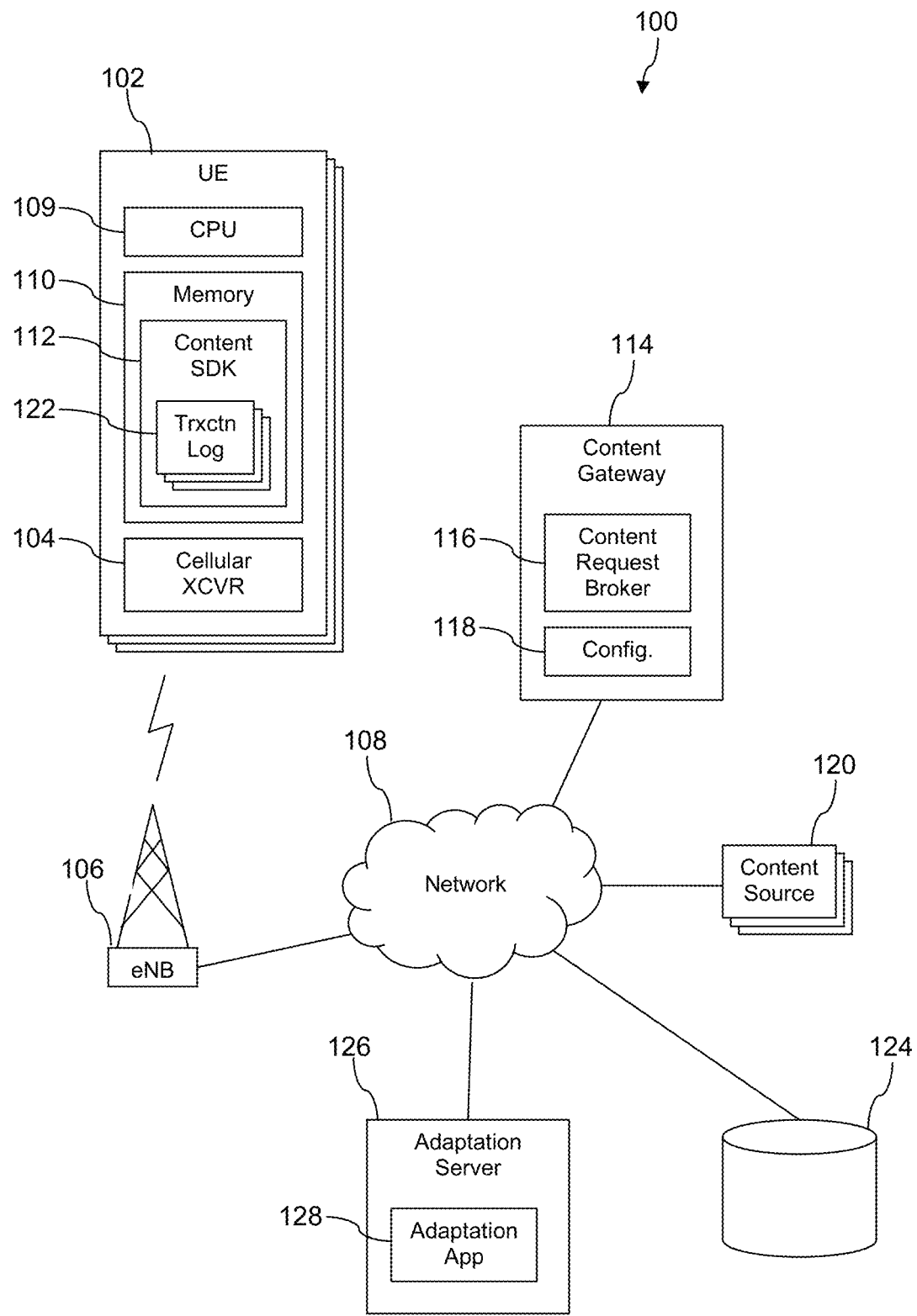
FIG. 1 is an illustration of communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Mobile communication devices, such as smart phones, may experience opportunities to present unsolicited content on a display triggered by initiation of a mobile application or by transitions within an executing mobile application. This content may be an advertisement, a notification pertaining to a known interest of a user of the device (i.e., a special interest content), or a public service announcement such as a warning about hazardous driving conditions or an impending storm. A software development kit (SDK) on the device and/or built into the executing mobile application may identify the opportunity to present content and send a content request to a content gateway. The content gateway may forward the content request to one or more content sources. The content gateway may receive a unit of content and transmit the content to the device, and the device may present the content. It is desirable that the opportunity to present content be rapidly fulfilled, for example in less than a second or even less than half a second, to avoid disturbing the user by changing the display.

The content gateway may be statically programmed to send content requests to a first content source and if the gateway does not receive a suitable unit of content timely in response to a content request, the gateway may send the content request to a second content source. If the second content source does not return a suitable unit of content timely, the gateway may send the content request to a third content source. The sequence in which the content gateway sends content requests to content sources may be statically configured in a configuration file stored in the content gateway. The statically configured sequence may be established to reflect business arrangements with third parties and/or an assessment of the throughput capacities of different content sources. But business arrangements may desirably be flexible and changeable, and throughput capacities may change for a variety of reasons. The present disclosure teaches analyzing a history of content requests and replies to determine a model of content replies in different operating conditions, monitoring the content requests and content replies to determine current operating conditions, and dynamically adapting the configured sequence for requesting content based on the model content requests and content replies as compared to current operating conditions.

For example, the content gateway operated by a wireless communication service provider may be configured to send content requests to content source A, content source B, and content source C. Because content source A has a demonstrated capacity for handling a larger volume of content requests than source B or source C (or because content source A has a preferred business arrangement with the wireless communication service provider, or for yet a different reason), the content gateway may be configured to send the content request first to source A and if source A fails to deliver a suitable unit of content before a predefined time interval has passed to then send the content request to either source B or to source C. But perhaps content source A has committed to sending out IP notifications reminding drivers of the resumption of public schools and to be careful of school children crossing streets on their way to or home from school and this causes content source A to be unable on this particular day to support its usual volume of content requests from the content gateway. The present disclosure teaches identifying this change in handling capacity on the part of content source A, by monitoring current content request handling and comparing to a history of content request handling, and dynamically adapting the configuration of sequencing. The configuration may be changed to use a round robin approach to sending out the content requests, for example sending a first content request first to source A, sending a second content request first to source B, sending a third content request first to source C, and sending a fourth content request first to source A.

It should be understood that the content gateway may receive tens of millions of content requests per hour and be in communication with tens of millions of mobile communication devices. Processing this volume of content requests from so many different devices timely is inherently a computer problem and the system is implemented with computer systems. Further, the teachings herein describe an improved computer system or improved computer systems to obtain solutions which could not be provided by a statically configured content handling sequence program.

An adaptation application executes on a computer system that is independent of the computer system on which a content request broker executes, whereby to avoid slowing the fulfillment of content requests from mobile communication devices by the content request broker. The content request broker receives content requests from mobile communication devices, sends content requests to content sources according to current conditions and based on sequencing rules defined in a configuration file, and routes the content replies back to the appropriate mobile communication devices. The content request broker logs content transactions and stores these logs in a data store. The mobile communication devices log content transactions and user responses to presented content and stores these logs in the data store. The adaptation application analyzes the logs in the data store to determine long-term capabilities of content sources and to determine current conditions. The adaptation application then adapts the sequencing rules based on this analysis and updates the configuration file used by the content request broker. The adaptation application may further adapt the sequencing rules based on business rules and business data, for example to take account of a daily quota of content requests that the wireless communication service provider may have agreed to send to one of the content sources. After the daily quota has been met, the sequencing rules may be adapted accordingly. Alternatively, if the daily quota has not been met but the end of the day is approaching, the sequencing rules may be adapted to allocate more of the content requests to the subject content source. The content request broker learns of the updated sequencing rules and applies these rules in distributing and/or allocating content requests.

The sequencing rules may identify thresholds and conditions for using the rules. The content request broker monitors current conditions related to content requests per unit of time, day of week, time of day, network traffic volume, and other current conditions and identifies one of the rules that best fits the current conditions. Each rule may comprise a sequencing rule and a criteria relating to current conditions. The rule whose criteria best matches to the current conditions is selected. The content request broker may evaluate current conditions versus criteria of the rules periodically, for example once per minute, once per five minutes, once per fifteen minutes, or some other periodic interval. These rules may be referred to as a model of content request and content reply behavior in the system. The model may, for example, predict a response based on an input of current conditions. Said in other words, the model may produce a preferred or optimal sequence for allocating content requests among a plurality of different content sources. In an alternative embodiment, to keep the content broker more streamlined and efficient, in an embodiment the model used by the content broker is kept simple, while the adaptation engine monitors logs to determine criteria and thresholds and replaces the simple model used by the content broker frequently with a different simple model. This is, in effect, outsourcing this task from the content broker to the adaptation engine monitor to allow the content broker to more narrowly focus on its primary task.

In an embodiment, the adaptation application generates the models based on analysis of logs of content requests and content replies and user interaction with content on mobile communication devices; monitors current conditions; selects a preferred or optimal sequence for allocating content requests among the plurality of different content sources; and configures that preferred sequence into the configuration file of the content request broker as a single rule. The content request broker then allocates content requests among the content sources in accordance with the configured rule. The adaptation application continues to monitor current conditions, modifying (i.e., adapting) the rule defining the preferred sequence in the configuration file as current conditions change.

The challenge in the content distribution system described above is the large volume of content being delivered by the system and the very short time deadlines for content delivery. The problem in the system is the inefficient operation of the statically configured content gateways. By analyzing logs of content requests and content fulfillment and adapting content request sequencing rules and processes accordingly, the computing efficiency of the content gateways is improved. Content can be delivered more quickly, because first requests for content by the content gateway are successful more frequently. Additionally, because the content gateway is not experiencing "misfires" (e.g., requests for content that are not timely fulfilled) that entail repetition of work as frequently, the work is done once by the content gateway and is done, which saves processing resources in the content gateway. Further, the extra added work of analyzing logs and deriving new content request sequencing rules or content delivery models in the system taught herein is not loaded onto the content gateway, which could otherwise have an offsetting effect on the improved efficiency, but is assigned to an adaptation application executing on a separate computer system.

Turning now to FIG. 1, a system 100 is described. In an embodiment, the system 100 comprises a mobile communication device (user equipment—UE) 102 that comprises a cellular radio transceiver 104 that establishes a wireless communication link with a cell site 106 according to one or more of a long term evolution (LTE), code division multiple access (CDMA), global system for mobile communication (GSM), or worldwide interoperability for microwave access (WiMAX) wireless telecommunications protocol. The cell site 106 may communicatively couple the device 102 to a network 108 to promote the device 102 placing voice calls or establishing data communication sessions. The device 102 may be a mobile phone, a smart phone, a personal digital assistant (PDA), a wearable computer, a headset computer, a laptop computer, a tablet computer, or a notebook computer. The device 102 may download and install mobile applications via the network 108. It may browse web sites via the network 108. The network comprises one or more public networks, one or more private networks, or a combination thereof. The system may comprise any number of mobile communication devices 102 and any number of cell sites 106. In an embodiment, the system 100 may comprise tens of millions of devices 102 and tens of thousands of cell sites 106.

The mobile communication device 102 further comprises a processor 109 and a memory 110. At least a portion of the memory 110 may be a non-transitory memory. The non-transitory portion of the memory 110 stores a content software development kit (SDK) 112. In an embodiment, the content SDK 112 may be embedded in one or more applications (not shown) such as a web browser, a navigation application, a gaming application, or other application installed on the device 102. Alternatively, the SDK 112 may be separate from other applications on the device 102 and monitor states of these applications as they execute on the device 102. The SDK 112 may be referred to as an application in some contexts herein and is executed by the processor 109.

The SDK 112 sends requests for content to be presented on a display (not shown) of the device 102 to a content request broker 116 that executes on a content gateway 114 and presents received units of content on the display. The SDK 112 further monitors and logs content requests, content receipts, content display, and content interactions in transaction logs 122 and sends bundles of logs 122 to a data store 124. A single transaction log 122 may comprise a plurality of items of information related to a single content request. Thus, a transaction log 122 may comprise the content request, the unit of content received by the SDK 112, information about display of the content (e.g., what application the content was displayed within, a portion of the screen the content was presented in), information about a user interaction with the content (e.g., did the user dismiss the content immediately? Did the user click on the content to obtain supplemental content? Did the user dismiss the content after a time lag?). In an embodiment, the SDK 112 bundles a plurality of transaction logs in a single JSON file and sends this JSON file to the data store 124. The SDK 112 may bundle about 15 transaction logs in a single JSON file. The SDK 112 may bundle about 20 transaction logs in a single JSON file. The SDK 112 may bundle about 25 transaction logs in a single JSON file. The SDK 112 may bundle about 40 transaction logs in a single JSON file.

The content request broker 116 sends the requests for content to content sources 120 based on sequencing rules defined in a configuration file 118. These rules may configure the content request broker 116 to send the content requests to the content sources 120 in a specific sequence. Content requests may be requests for advertisement content, for public service announcement content, for special interest content, for general interest content, or other content. The content gateway 114 may be implemented as a computer system. Computer systems are described further hereinafter. Content sources 120 may be implemented as computer systems. Content sources may be referred to as content providers.

It is understood that the idea of sending content requests to the content sources 120 is intended to be a broad idea and to cover a wide variety of different possible sequences. The sequencing relates both to a possible sequence of which content source 120 to send a content request to first as well as a sequence for sending a content request secondly to a content source 120 or sending a content request thirdly to a content source 120. To illustrate this, a variety of examples of sequencing rules will now be described, but it is understood that other sequencing rules are contemplated by the present disclosure. One sequencing rule may be that every content request be sent first to a content source A, if content source A fails to return a suitable unit of content timely, the content request be sent second to a content source B, and if content source B fails to return a suitable unit of content timely, the content request be sent third to a content source C. A different sequencing rule may be that the content source which receives the content request first varies in some way. For example, a first content request is sent first to source A, a second content request is sent first to source B, a third content request is sent first to source C, and a fourth content request is sent first to source A again. The sequence of sending first requests could be represented by a repeating pattern of content sources. For example, in the first example (all first requests sent to source A) the pattern could be represented as "A," because this is the repeating pattern. In the second example, the sequence could be represented as "ABC." In another example, two different content requests are sent first to source A, the third content request is sent first to source B, the fourth content request is sent first to source C, and then the pattern repeats. This third example could be represented as "AABC." A fourth example could be represented by "AABAAC." In the event of failure of the first source to provide a suitable unit of content timely, the content request may secondly be sent to the next content source in line for the current sequence pattern. For example, if the pattern is AABC and source B was sent the content request first, the content request may be sent secondly to source C, and if source C fails to return a suitable unit of content timely, the content request may be sent thirdly to source A.

The content request broker 116 imposes a timeliness deadline for content sources 120 to respond to a content request. The timeliness deadlines for a first source may be different from the deadline to respond as the second source or a third source in the sequence. Alternatively, the same timeliness deadline may be applied to content sources 120 independently of whether they have received the content request first in the sequence, second in the sequence, or third in the sequence. In an embodiment, a timeliness deadline may be about 50 ms, about 100 ms, about 150 ms, or about 250 ms.

The content request broker 116 may further impose a suitability restriction on units of content returned by the content sources 120. For example, if the returned unit of content is pornographic in nature, the content request broker 116 may reject that unit of content and send the content request to a different content source 120. Content may be deemed unsuitable based on an application executing on the device 102 where the unit of content may be presented. For example, it the mobile application is an environmentalism application, an announcement promoting the advantages of a new pipeline construction project may be deemed unsuitable by the content request broker 116; if the mobile application is a children's game, an advertisement promoting premium whisky may be deemed unsuitable by the content request broker 116. These are examples of suitability determinations, but it is understood that other suitability filters may be applied as well. The suitability restriction may be defined as a screening criteria that the content request broker 116 applies to pass suitable content and reject unsuitable content. Sometimes a content source 120 may send a content reply that carries an error code or otherwise indicates the content source 120 has not content to provide at the current time.

In an embodiment, content requests sent by the content SDK 112 to the content request broker 116 may provide information about the content presentation context. For example, an application executing on the device 102 in which the content will be presented, the model of the device 102, or other information. The content request broker 116 may supplement information provided in the content request sent by the SDK 112 with further information such as demographic information about a wireless communication service subscriber associated with the device 102 and profile information about the subscriber. The content request broker 116 sends reports and/or logs to the data store 124 about content requests, content responses, time outs, error messages received from content sources 120, unsuitable content received from content sources 120.

The sequencing rules defined in the configuration file 118 are determined by an adaptation application 128 executing on an adaptation computer system 126. The adaptation application 128 may be stored in a non-transitory memory of the adaption computer system 126 and executed by a processor of the adaptation computer system 126. The adaptation application 128 monitors transaction logs sent by devices 102 to the data store 124 as well as other logs and reports provided by the content request broker 116 to the data store 124. The logs and reports in the data store 124 may be referred to as historical data or historical content request and content reply and user interaction data. The adaptation application 128 analyzes the data retrieved from the data store 124 to determine sequencing rules and then writes these sequencing rules into the configuration 118 of the content gateway 114. It is observed that by delegating this monitoring, analyzing, and configuration updating functionality to the separate platform of the adaptation computer system 126 the content gateway 114 is unburdened by those functions and is not subject to content request processing slowdowns that may otherwise result from also handling the rules generation capability. These rules may be referred to as a model or as a model of content request distribution or allocation.

The sequencing rules determined by the adaptation application 128 and written into the configuration file 118 may be a set rule which the content request broker 116 applies invariably in allocating content requests to content sources 120. As current conditions in the system 100 change, the adaptation application 128 observes those changed conditions, adapts the sequencing rule accordingly, and writes the adapted sequencing rule into the configuration file 118. Alternatively, the adaptation application 128 defines a plurality of sequencing rules, where each of those sequencing rules comprises the sequence pattern for allocating content requests to content sources 120 but further comprises a criteria which the content request broker 116 compares to current conditions of the system 100 and applies the sequencing rule that is associated with the criteria that best matches current conditions. Current conditions may be a rate of timeliness failures of a content source 120 (i.e., a rate of timeouts), a rate of errors returned from a content source 120 (e.g., an indication of no content available to be provided), and/or a traffic volume in the network 108. It is an implementation detail as to which of these approaches is used in the system 100. Without wishing to be bound by theory, providing sequencing rules with criteria evaluated by the content request broker 116 may be preferred when the adaptation application 128 updates the sequencing rules relatively infrequently (e.g., once per day, once per week, once every two weeks, or some other interval of time) and providing a sequencing rule that is applied invariably may be preferred when the adaptation application 128 updates the sequencing rule relatively frequently (e.g., once per minute, once every five minutes, once every fifteen minutes).

The criteria that is bound to the sequencing rules in one embodiment may relate to a day of the week and a time of the day. Different sequencing rules, then, may be defined to apply based on analysis of operating conditions in the system 100 on different days and different times of the day, adapting the sequencing of allocation of content requests to the content sources 120 based on history. The criteria that is bound to the sequencing rules in the one embodiment may relate to performance thresholds. For example, a performance threshold related to timeliness performance may be specified as a criteria. If a particular content source 120 fails to reply timely to more than 30 percent of content requests sent to that content source 120 first, this may exceed a threshold defined in a criteria and cause the content request broker 116 to select a different sequencing rule from the configuration file 118. The content request broker 116 may not evaluate the current conditions versus the criteria of the sequencing rules stored in the configuration file 118 on every content request but may evaluate after every five content requests, after every ten content requests, after every 100 content requests, or after some other predefined number of content requests.

The criteria may relate to a quota of content requests, for example a daily number of content requests that may be contractually promised to a specific content source 120. The content request broker 116 may count the content requests sent to that specific content source 120 and when the daily quota is attained, select a different sequencing rule based on the criteria. The criteria involving a daily quota may be defined with reference to a fraction of the quota versus a fraction of the day remaining. For example, if half of the daily quota of content requests have already been sent to the specific content source 120 but the day is only 10% through, the criteria may select a different sequencing rule which allocates proportionally fewer content requests to that content source 120. As the day moves forwards, if the number of content requests sent to that content source 120 is lagging relative to the daily quota and the day is 80% through, the criteria may select a sequencing rule that relies more heavily on sending content requests to that content source 120 first.

The criteria may relate to traffic volumes generally in the network 108. The criteria may relate to content request rates at the current time. The criteria may relate to timeliness failures (e.g., timeouts). The criteria may relate to errors returned from a content source 120 where the error indicates the content source 120 has no content available at the current time.

Figure 2:
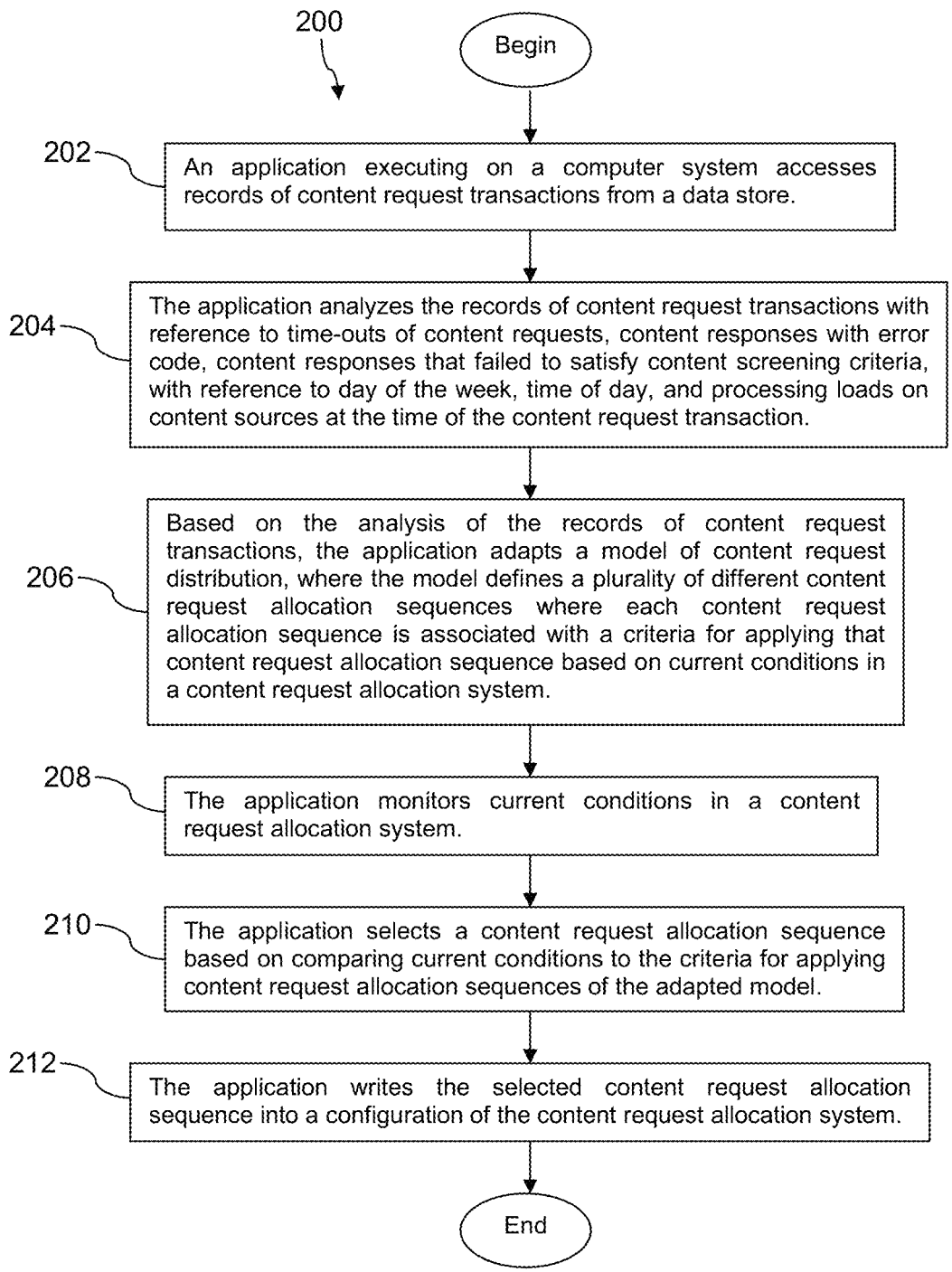
FIG. 2 is a flow chart of a method according to an embodiment of the disclosure.

Turning now to FIG. 2, a method 200 is described. At block 202, an application executing on a computer system accesses records of content request transactions from a data store. At block 204, the application analyzes the records of content request transactions with reference to time-outs of content requests, content responses with error code, content responses that failed to satisfy content screening criteria, with reference to day of the week, time of day, and processing loads on content sources at the time of the content request transaction. Time-outs may occur if a content source does not provide a content reply timely. For example, time-outs may occur if a content request is not replied to within about 250 ms. Time-outs may occur if a content request is not replied to within about 125 ms. The application may analyze a rate of timeliness failures of a content source. Said in other words, the rate of timeliness failures of content sources may be one of the monitored current conditions. Traffic volumes in the network may also be one of the monitored current conditions.

At block 206, based on the analysis of the records of content request transactions, the application adapts a model of content request distribution, where the model defines a plurality of different content request allocation sequences where each content request allocation sequence is associated with a criteria for applying that content request allocation sequence based on current conditions in a content request allocation system. At block 208, the application monitors current conditions in a content request allocation system At block 210, the application selects a content request allocation sequence based on comparing current conditions to the criteria for applying content request allocation sequences of the adapted model. At block 212, the application writes the selected content request allocation sequence into a configuration of the content request allocation system.

Figure 3:
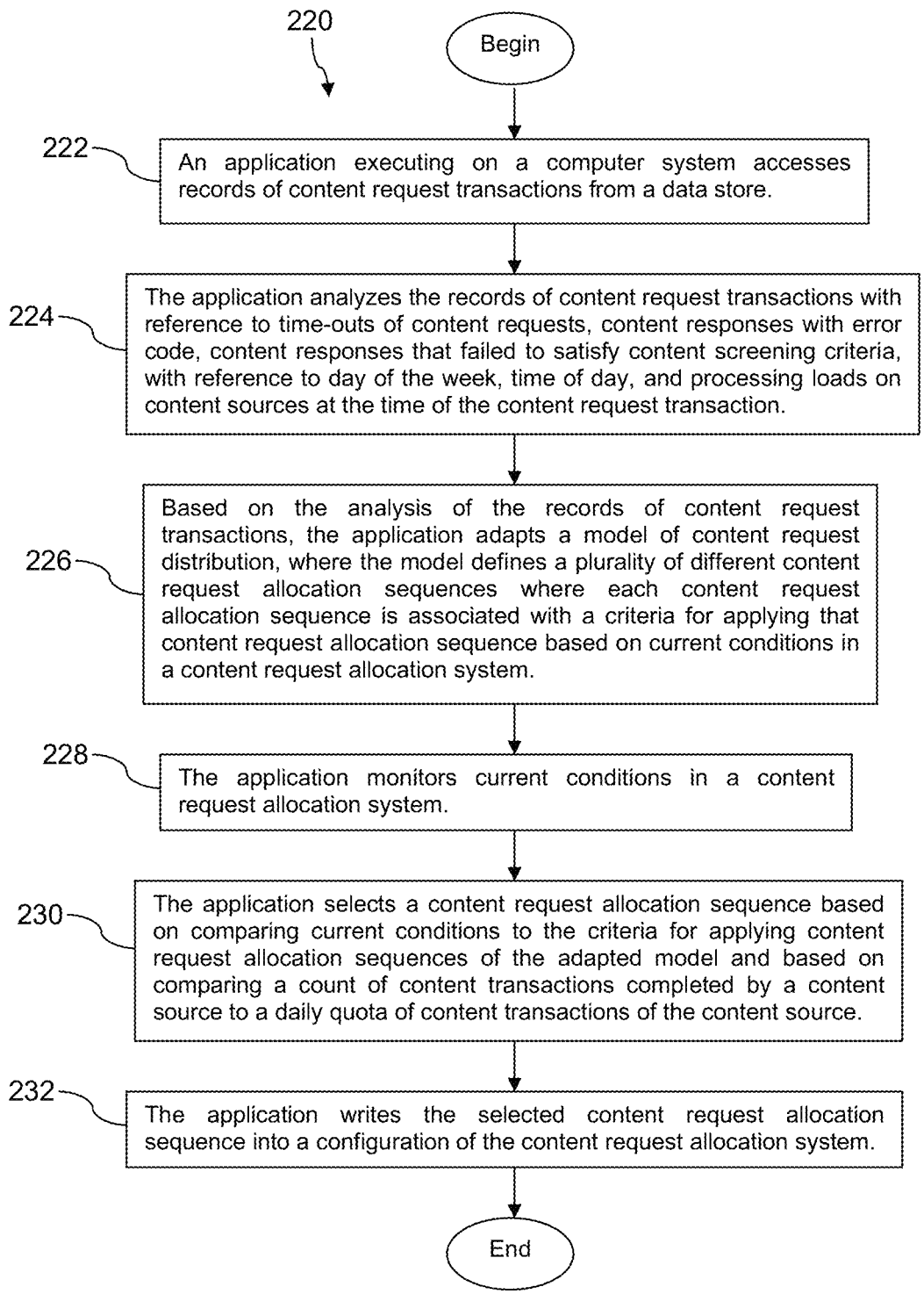
FIG. 3 is a flow chart of a method according to an embodiment of the disclosure.

Turning now to FIG. 3, a method 220 is described. At block 222, an application executing on a computer system accesses records of content request transactions from a data store. At block 224, the application analyzes the records of content request transactions with reference to time-outs of content requests, content responses with error code, content responses that failed to satisfy content screening criteria, with reference to day of the week, time of day, and processing loads on content sources at the time of the content request transaction.

At block 226, based on the analysis of the records of content request transactions, the application adapts a model of content request distribution, where the model defines a plurality of different content request allocation sequences where each content request allocation sequence is associated with a criteria for applying that content request allocation sequence based on current conditions in a content request allocation system. At block 228, the application monitors current conditions in a content request allocation system At block 230, the application selects a content request allocation sequence based on comparing current conditions to the criteria for applying content request allocation sequences of the adapted model and based on comparing a count of content transactions completed by a content source to a daily quota of content transactions of the content source. Comparing the count of content transactions completed by the content source to a daily quota of content transactions may be done in a variety of ways. The comparison may consider simply whether the quota has been satisfied or not satisfied. Alternatively, the comparison may consider a pro rata quota versus a portion of the day that has been completed to determine whether satisfaction of the daily quota is on schedule, is behind schedule, or is ahead of schedule. For example, if 50% of the daily quota is completed and the day is half-over, progress towards satisfying the daily quota may be said to be on track. If 50% of the daily quota is completed and the day is only a quarter-over, progress towards satisfying the daily quota may be said to be ahead of schedule. If 50% of the daily quota is completed and the day is three-quarters-over, progress towards satisfying the daily quota may be said to be behind schedule. This determination of progress relative to the passing of time may be made with reference to a projection of content presentation opportunities per day or with reference to considerations of a diurnal variation of content presentation opportunities at different times of the day. At block 232, the application writes the selected content request allocation sequence into a configuration of the content request allocation system.

Figure 4:
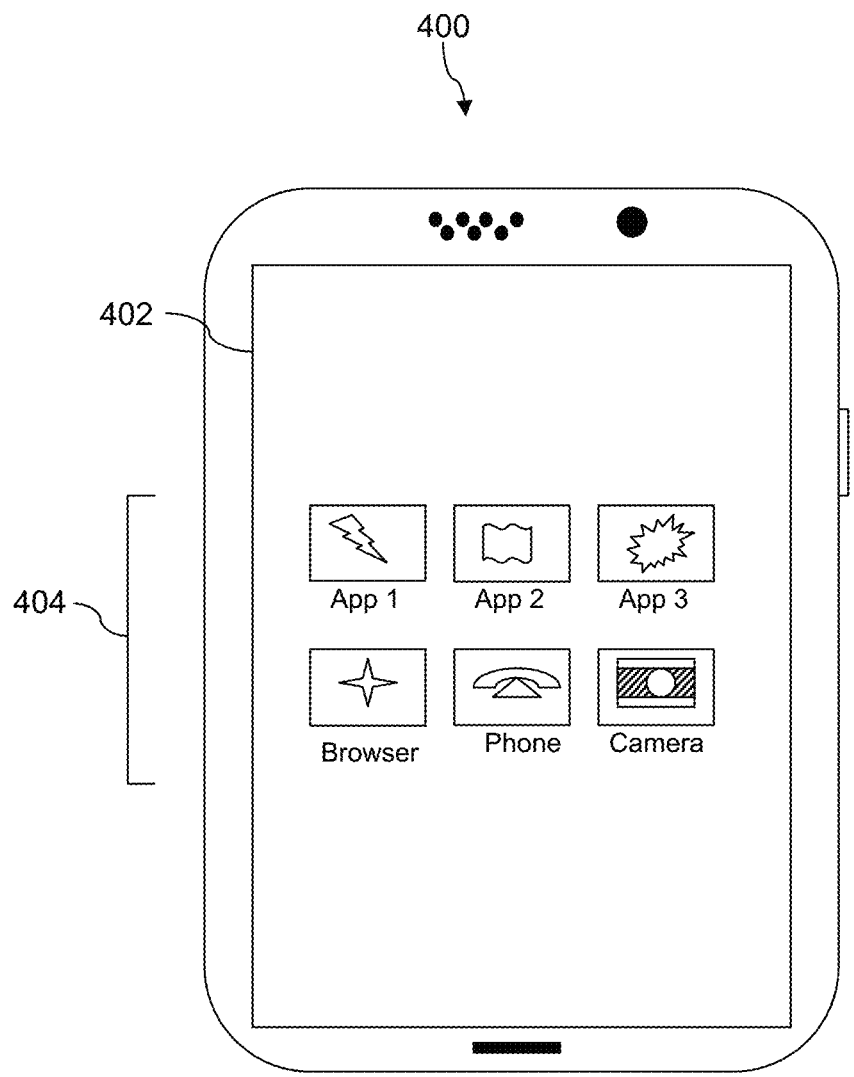
FIG. 4 is an illustration of a mobile communication device according to an embodiment of the disclosure.

FIG. 4 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touch-screen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
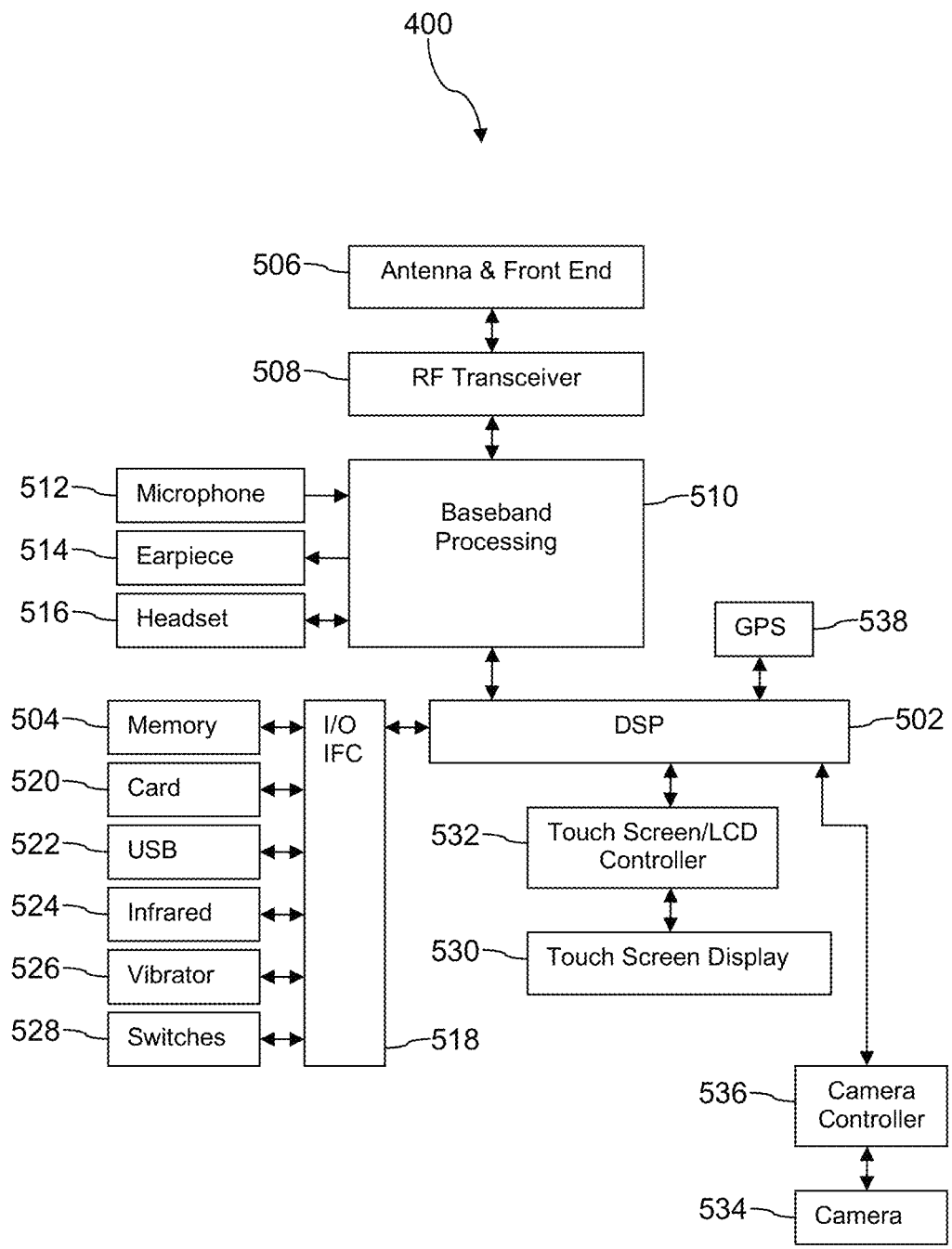
FIG. 5 is a block diagram of a hardware architecture according to an embodiment of the disclosure.

FIG. 5 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
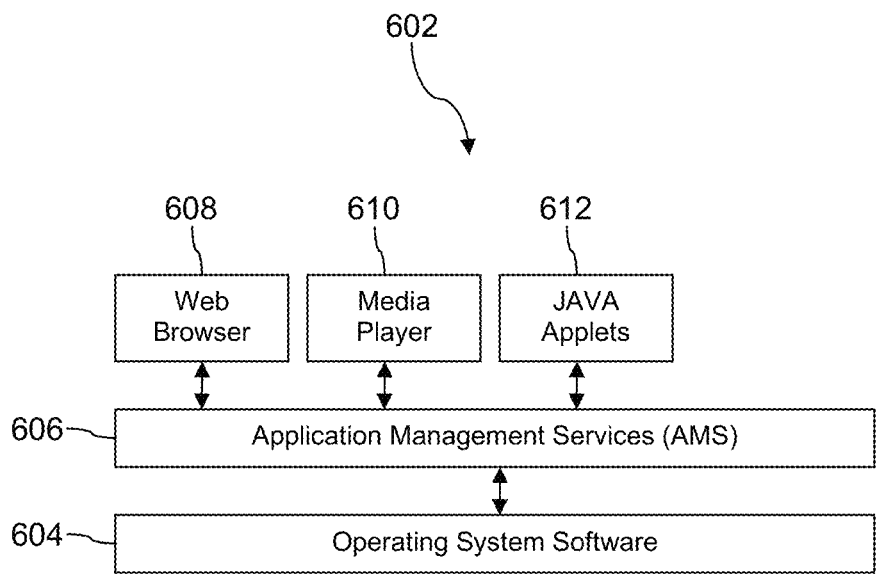
FIG. 6A is a block diagram of a software architecture according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 6B:
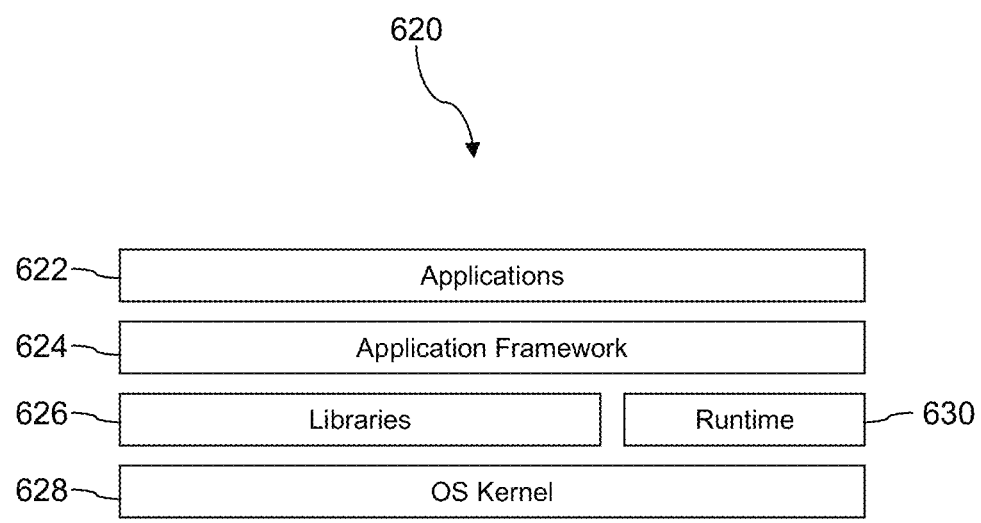
FIG. 6B is a block diagram of another software architecture according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
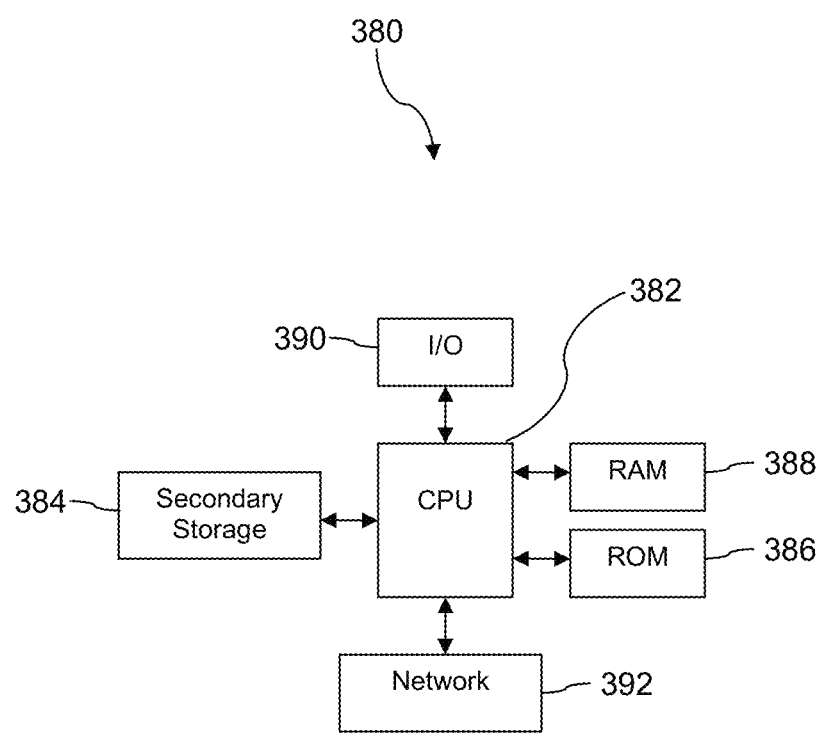
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A content request allocation adaptation system, comprising:
- a processor;
- a non-transitory memory; and
- an application stored in the non-transitory memory that, when executed by a processor;
    - accesses records of content request transactions from a data store,
    - analyzes the records of content request transactions with reference to time-outs of content requests, content responses with error code, content responses that failed to satisfy content screening criteria, with reference to day of the week, time of day, and processing loads on content sources at the time of the content request transaction,
    - based on the analysis of the records of content request transactions, adapts a model of content request distribution, where the model defines a plurality of different content request allocation sequences corresponding to different operating conditions, where each content request allocation sequence is associated with a criteria relating to an operating condition for applying that content request allocation sequence based on current conditions in a content request allocation system, and where adapting the model comprises changing at least one content request allocation sequence for at least one operating condition to at least one updated content request allocation sequence such that if the at least one operating condition occurs, the at least one updated content request allocation sequence will be applied,
    - monitors current conditions in a content request allocation system responsible for sending requests for content to content sources based on sequencing rules in a configuration file, where the content request allocation system is separate from the content request allocation adaptation system,
    - compares the current conditions to the criteria associated with each content request allocation sequence,
    - selects a content request allocation sequence of the plurality of different content request allocation sequences whose corresponding criteria matches the current conditions based on the comparison, and
    - writes the selected content request allocation sequence into the configuration file of the content request allocation system,
    - whereby the content request allocation system is dynamically adapted to current conditions of the content request allocation system.

2. The content request allocation adaptation system of claim 1, wherein the content request allocation sequences defines which of a plurality of different content sources to first send a content request to.

3. The content request allocation adaptation system of claim 2, wherein at least some of the content request sequences defines a repeating pattern of content sources to send a content request to first.

4. The content request allocation adaptation system of claim 1, wherein the content requests request one of an advertisement content, a public service announcement content, or a special interest content.

5. The content request allocation adaptation system of claim 1, wherein the current conditions comprise a rate of timeliness failures of a content source.

6. The content request allocation adaptation system of claim 1, wherein the current conditions comprise a rate or errors returned from a content source.

7. The content request allocation adaptation system of claim 1, wherein the current conditions comprise a traffic volume in a communication network.

8. A method of dynamically allocating content requests to content sources, each step of the method performed by an application executing on a computer system, the method comprising:
- accessing records of content request transactions from a data store;
- analyzing the records of content request transactions with reference to time-outs of content requests, content responses with error code, content responses that failed to satisfy content screening criteria, with reference to day of the week, time of day, and processing loads on content sources at the time of the content request transaction;
- based on the analysis of the records of content request transactions, adapting a model of content request distribution, where the model defines a plurality of different content request allocation sequences corresponding to different operating conditions, where each content request allocation sequence is associated with a criteria relating to an operating condition for applying that content request allocation sequence based on current conditions in a content request allocation system, and where adapting the model comprises changing at least one content request allocation sequence for at least one operating condition to at least one updated content request allocation sequence such that if the at least one operating condition occurs, the at least one updated content request allocation sequence will be applied;
- monitoring current conditions in the content request allocation system;
- comparing the current conditions to the criteria associated with each content request allocation sequence;
- selecting a content request allocation sequence of the plurality of different content request allocation sequences whose corresponding criteria matches the current conditions based on the comparing; and
- writing the selected content request allocation sequence by the application into a configuration of the content request allocation system,
- whereby the content request allocation system is dynamically adapted to current conditions of the content request allocation system.

9. The method of claim 8, wherein the content request allocation sequences defines which of a plurality of different content sources to first send a content request to.

10. The method of claim 9, wherein at least some of the content request sequences defines a repeating pattern of content sources to send a content request to first.

11. The method of claim 8, wherein the content requests request one of an advertisement content, a public service announcement content, or a special interest content.

12. The method of claim 8, wherein the time-outs occur when a content request is not replied to within about 250 ms or less.

13. The method of claim 8, wherein the current conditions comprise a rate of timeliness failures of a content source.

14. The method of claim 8, wherein the current conditions comprise a traffic volume in a communication network.

15. A method of dynamically allocating content requests to content sources, each step of the method performed by an application executing on a computer system, the method comprising:

accessing records of content request transactions from a data store;

analyzing the records of content request transactions with reference to time-outs of content requests, content responses with error code, content responses that failed to satisfy content screening criteria, with reference to day of the week, time of day, and processing loads on content sources at the time of the content request transaction;

based on the analysis of the records of content request transactions, adapting a model of content request distribution, where the model defines a plurality of different content request allocation sequences corresponding to different operating conditions, where each content request allocation sequence is associated with a criteria relating to an operating condition for applying that content request allocation sequence based on current conditions in a content request allocation system, and where adapting the model comprises changing at least one content request allocation sequence for at least one operating condition to at least one updated content request allocation sequence such that if the at least one operating condition occurs, the at least one updated content request allocation sequence will be applied;

monitoring current conditions in the content request allocation system;

comparing the current conditions to the criteria associated with each content request allocation sequence;

selecting a content request allocation sequence of the plurality of different content request allocation sequences whose corresponding criteria matches the current conditions based on the comparing and based on comparing a count of content transactions completed by a content source to a daily quota of content transactions of the content source; and writing the selected content request allocation sequence into a configuration of the content request allocation system, whereby the content request allocation system is dynamically adapted to current conditions of the content request allocation system.

16. The method of claim 15, wherein selecting the content allocation sequence based on comparing the count of content transactions completed by a content source to the daily quote of content transactions comprises comparing the count of content transactions completed to a fraction of the day completed.

17. The method of claim 15, wherein the content requests request one of an advertisement content, a public service announcement content, or a special interest content.

18. The method of claim 15, wherein the time-outs occur when a content request is not replied to within about 250 ms or less.

19. The method of claim 15, wherein the current conditions comprise a rate of timeliness failures of a content source.

20. The method of claim 15, wherein the current conditions comprise a traffic volume in a communication network.

* * * * *